United States Patent
Brandt et al.

(10) Patent No.: US 11,707,989 B2
(45) Date of Patent: Jul. 25, 2023

(54) METHOD FOR PROTECTING AN ELECTRIC MACHINE OF A MOTOR VEHICLE

(71) Applicant: Robert Bosch GmbH, Stuttgart (DE)

(72) Inventors: Martin Brandt, Sachsenheim (DE); Michael Baeuerle, Eberdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 329 days.

(21) Appl. No.: 16/938,525

(22) Filed: Jul. 24, 2020

(65) Prior Publication Data
US 2021/0031633 A1 Feb. 4, 2021

(30) Foreign Application Priority Data
Aug. 2, 2019 (DE) .......................... 102019211614.0

(51) Int. Cl.
*B60L 15/00* (2006.01)
*B60L 15/20* (2006.01)
*H02P 29/032* (2016.01)

(52) U.S. Cl.
CPC ............ *B60L 15/20* (2013.01); *H02P 29/032* (2016.02)

(58) Field of Classification Search
CPC ........ B60L 15/20; B60L 2260/42; B60L 3/12; B60L 3/0061; H02P 29/032; H02P 29/02; Y02T 10/64; Y02T 10/72; F02B 37/10; F02B 37/12; F02B 37/14
See application file for complete search history.

(56) References Cited

U.S. PATENT DOCUMENTS

| | | | | |
|---|---|---|---|---|
| 5,531,122 A * | 7/1996 | Chatham | ................... | G07C 3/00 73/806 |
| 6,158,541 A * | 12/2000 | Tabata | .................. | B60K 6/445 903/903 |
| 2003/0158803 A1* | 8/2003 | Darken | ................ | G06Q 10/087 705/36 R |
| 2009/0118877 A1* | 5/2009 | Center | .................. | B60L 3/0046 701/22 |
| 2013/0257450 A1* | 10/2013 | Omori | ..................... | G01R 31/58 324/543 |
| 2016/0001657 A1* | 1/2016 | Koller | .................... | B60L 3/0084 307/10.1 |
| 2016/0297302 A1* | 10/2016 | Reuter | ................... | B60L 3/0084 |
| 2018/0010491 A1* | 1/2018 | Yamahata | .............. | B60K 6/445 |
| 2021/0031633 A1* | 2/2021 | Brandt | .................. | B60L 3/0061 |

FOREIGN PATENT DOCUMENTS

DE 10156704 A1 5/2003
DE 10302453 A1 8/2003

* cited by examiner

*Primary Examiner* — Jacob M Amick
*Assistant Examiner* — Sherman D Manley
(74) *Attorney, Agent, or Firm* — Norton Rose Fulbright US LLP; Gerard Messina

(57) ABSTRACT

A method for protecting an electric machine of a motor vehicle, In the method, a switch-on frequency for the electric machine is ascertained as a function of operating parameters of the motor vehicle stored in a control unit. The switch-on frequency is compared to a predefinable first threshold value. At least one further threshold value is preset. The electric machine is switched on in the event a control variance exceeds the at least one further threshold value. In the event the switch-on frequency exceeds the first predefinable threshold value, the at least one further threshold value is adapted in such a way that the switch-on frequency of the electric machine is limited.

10 Claims, 2 Drawing Sheets

METHOD FOR PROTECTING AN ELECTRIC MACHINE OF A MOTOR VEHICLE

CROSS REFERENCE

The present application claims the benefit under 35 U.S.C. § 119 of German Patent Application No. 102019211614.0 filed on Aug. 2, 2019, which is expressly incorporated herein by reference in its entirety.

BACKGROUND INFORMATION

The state of the art is an electronic boost-pressure control for single-stage and dual-stage exhaust-gas turbochargers. In that context, the charge-air pressure of an exhaust-gas turbocharger is corrected to a charge-air-pressure setpoint with the aid of a closed-loop control. In so doing, the charge-air pressure is controlled via a bypass for the turbine (wastegate) or by a variable turbine geometry (VTG).

German Patent Application No. DE 103 02 453 A1 describes a method and a device for controlling the charge-air pressure of an exhaust-gas turbocharger (1), in which an actual charge-air-pressure value (pvdkds) is corrected to a setpoint charge-air-pressure value (plsoll). In that case, the charge-air pressure of the exhaust-gas turbocharger (1) is controlled as a function of a characteristic size of an electrical auxiliary supercharger (5) cooperating with the exhaust-gas turbocharger (1) to compress the aspirated air. In this way, unnecessary opening of a bypass valve of the exhaust-gas turbocharger (1) is avoided.

The combination of single-stage exhaust-gas turbocharging with a supplementary electrical compressor connected in series is also familiar.

German Patent Application No. DE 101 56 704 A1 describes a method and a device for operating an exhaust-gas turbocharger for an internal combustion engine, where in addition to the drive of an exhaust-gas turbine, the exhaust-gas turbocharger is driven by an air-cooled electric motor, preferably a synchronous machine. The electric machine (5) has a sensor (16) for measuring its temperature and a cooled-air line (8) which feeds to it cooled charge air downstream of a charge-air cooler (9) for the cooling. The objective is achieved, on one hand, of providing a simple method for operating an exhaust-gas turbocharger, boosted by an electric auxiliary drive, by which the electrical boost of the turbocharger is accomplished in optimal fashion and an overload of the auxiliary drive is avoided, and on the other hand, of designing a device having controllable air-cooled electric drive for this purpose.

SUMMARY

In a first aspect of the present invention, an example method is provided for protecting an electric machine of a motor vehicle. In accordance with an example embodiment of the present invention, a switch-on frequency for the electric machine is ascertained as a function of operating parameters of the motor vehicle stored in a control unit, the switch-on frequency being compared to a predefinable first threshold value, at least one further threshold value being preset, the electric machine being switched on in the event a control variance exceeds the at least one further threshold value, and in the event the switch-on frequency exceeds the first predefinable threshold value, the at least one further threshold value being adapted in such a way that a switch-on frequency of the electric machine is limited.

The example method has an advantage that the switch-on frequency for the electric machine may be limited as a function of a life expectancy of the electric machine and/or of the motor vehicle. Switching on the electric machine subjects it, and the electronics associated with it, to stress factors such as, e.g., the effect of temperature owing to the power consumption of the electric machine during operation. The electric machine is protected by the method and adapted to the expected service life of the motor vehicle, so that the operation of the electric machine may be optimized to the expected service life assumed for the motor vehicle.

It is advantageous if the at least one further predefinable threshold value is a threshold value for a boost operation or a recuperative operation of the electric machine. Since the electric machine is switched on in recuperative operation as well as in boost operation, it is useful to be able to preset a threshold value in order to be able to control a switch-on or activation of the electric machine.

In addition, one predefinable threshold value each may be specified for the boost operation and for the recuperative operation of the electric machine. Since the electric machine is switched on in recuperative as well as in boost operation, it is useful to be able to specify a threshold value for both operating modes. With the aid of these threshold values, the switch-on threshold may be set separately for the recuperative and for the boost operating mode.

It is advantageous if a split for the limitation between the boost operation and the recuperative operation of the electric machine is preset as a function of a weighting factor. Due to the weighting between the two operating modes, one operating mode is able to be prioritized. In one application case in which, for example, the recuperative operating mode of the electric machine is relevant in terms of emissions, it is advantageous if based on the weighting, the recuperative operating mode is limited less frequently than the boost operating mode of the electric machine. The component may thus be protected by this split of the limitation, and at the same time, an emissions violation may be prevented.

In addition, the first predefinable threshold value may be ascertained as a function of operating parameters of the electric machine which make it possible to draw a conclusion about the service life of the electric machine.

Moreover, it is advantageous that the operating parameters correspond to a measured number of switch-on operations of the electric machine and/or an operating time of the electric machine and/or an active operation of the electric machine per kilometer traveled by the motor vehicle.

In addition, the switch-on frequency may be determined as a function of switch-on operations and/or a distance traveled by the motor vehicle.

It is advantageous if the control variance for the recuperative operation of the electric machine is determined as a function of a desired torque and an actual torque and/or a desired output and an actual output of the motor vehicle.

It is also advantageous if the control variance for the boost operation of the electric machine is determined as a function of a desired torque and an actual torque and/or a desired rate of airflow and an actual rate of airflow and/or a desired charge-air pressure and an actual charge-air pressure and/or a desired output and an actual output of the motor vehicle.

In further aspects, the present invention provides a device, particularly a control unit and a computer program, which are equipped, especially programmed, to carry out one of the methods. In yet another aspect, the present invention relates to a machine-readable storage medium on which the computer program is stored.

BRIEF DESCRIPTION OF THE DRAWINGS

Below, the present invention is described in greater detail with reference to the figures and with the aid of exemplary embodiments.

DETAILED DESCRIPTION OF EXAMPLE EMBODIMENTS

Figure 1:
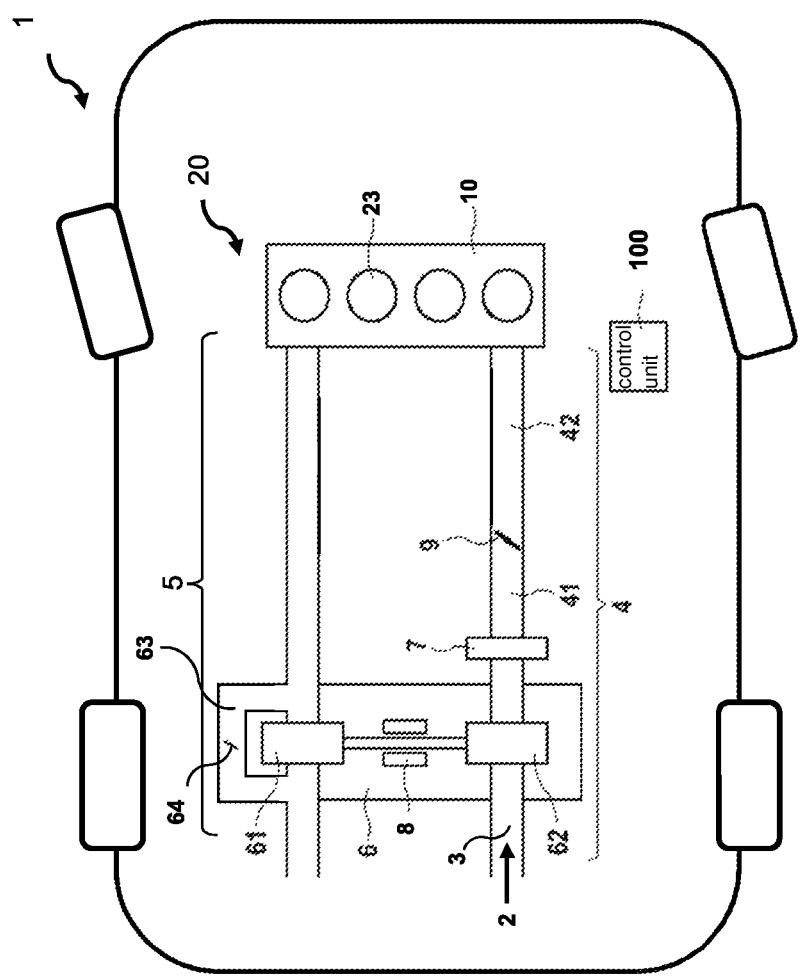
FIG. 1 shows a schematic representation of a motor vehicle 1 having an internal combustion engine 10.

FIG. 1 shows a motor vehicle 1 having a motor system 20 and an internal combustion engine 10 that has a number of cylinders 23. The present exemplary embodiment shows, without restriction, a four-cylinder internal combustion engine 10. Preferably, internal combustion engine 10 may take the form of a diesel engine or gasoline engine. The method may also be carried out with internal combustion engine 10 having 2, 3, 6, or 8 cylinders.

Alternatively, the method may also be transferred to a purely electrically-powered motor vehicle.

Internal combustion engine 10 is supplied in a conventional manner with ambient air via an air-feed system 4, and combustion exhaust gas is removed from cylinders 23 via an exhaust system 5. Air-feed system 4 is connected in a conventional fashion via intake valves (not shown) to cylinders 23 of internal combustion engine 10. Combustion exhaust gas is exhausted in a conventional manner via corresponding exhaust valves (not shown) into exhaust system 5.

Disposed in the direction of flow of air 2 are the following: A hot-film air-mass meter 3 (HFM), a supercharging device which has an exhaust-gas turbine 61 in exhaust system 5 and has a compressor 62 in air-feed system 4. The supercharging device is constructed as an electrically assisted exhaust-gas turbocharger 6. Turbine 61 is coupled mechanically to compressor 62, so that exhaust-gas enthalpy, which is converted in turbine 61 into mechanical energy, is used to compress ambient air, taken from the environment, in compressor 62.

In addition, the supercharging device may be operated electrically with the aid of an electric machine 8, which is able to contribute additional mechanical energy via a mechanical coupling between turbine 61, compressor 62 and electric machine 8, so that compressor 62 may also be operated independently of mechanical energy provided by the turbine, or even in boost mode.

The electric boost drive may be implemented in various forms. For example, as a media gap motor upstream of compressor impeller 62 or as a centrally placed motor between the turbine and the compressor impeller.

A charge-air cooler 7 may be provided downstream of compressor 62.

The charge-air pressure in charge-air section 41 results from the compression output of compressor 62.

Charge-air section 41 is bounded downstream by a throttle valve 9. An intake-manifold section 42 of air-feed system 4 is located between throttle valve 9 and intake valves (not shown) of cylinders 23 of internal combustion engine 10.

A control unit 100 is provided which operates internal combustion engine 10 in a conventional manner by adjusting the positioning elements, like throttle valve 9, for example, a supercharger control element at turbine 61 and the like according to an instantaneous operating state of internal combustion engine 10 and according to a specification, e.g., a torque desired by the driver.

In addition, what is referred to as a bypass 63 is connected in parallel to turbine 61. A valve 64, also known as a wastegate, is disposed in the bypass. If valve 64 is in the closed state, then the flow of exhaust gas is conducted completely through turbine 61. If valve 64 is in the open state, then at least a portion of the flow of exhaust gas is conducted past turbine 61.

In an alternative embodiment, an effective flow cross-section of the turbine inlet is variable. To that end, for example, adjustable guide vanes may be disposed in a turbine housing of electrically assisted exhaust-gas turbocharger 6, in which the turbine wheel is situated. By adjusting the setting of the guide vanes, the rotational speed of the turbine wheel may be changed while the flow of exhaust gas remains the same, whereby the compression produced by the compressor impeller, the so-called charge-air pressure, may be altered. The electrically assisted exhaust-gas turbocharger with variable turbine geometry preferably has a radial turbine and a radial compressor. Within the turbine-wheel inlet, a guide-vane mimic may be provided, which is adjusted via an electric actuator. As a result, by rotating the guide vanes, the effective flow cross-section may be varied upstream of the turbine wheel.

The switch-on cycles of electric machines and the components associated with that are limited by various stress factors. Frequent temperature changes due to power input and withdrawal, thus, due to recuperative and boost operation, reduce the service life of electric machine 8. So-called solder spalling and/or detachment of bonding wires may occur on the component. Therefore, monitoring and a strategy for operating electric machine 8 on the basis of an increasing service life of electric machine 8 are advantageous. The service life of an electric machine 8 amounts to approximately 1.5 million switch-on operations, for example. It is thus advantageous to adapt the switch-on operations of electric machine 8 to the lifespan of motor vehicle 1.

Alternatively, motor vehicle 1 may also be implemented as a purely electrically operated motor vehicle.

Figure 2:
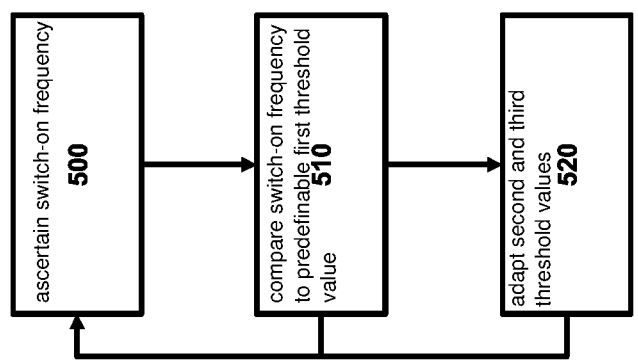
FIG. 2 shows an exemplary functional sequence of the method with the aid of a flowchart of one preferred specific example embodiment.

FIG. 2 shows the exemplary functional sequence of the method for protecting an electric machine 8 of a motor vehicle 1 with the aid of a flowchart.

In a first step 500, a switch-on frequency is ascertained from operating parameters stored in control unit 100. The operating parameters used in this case are preferably the kilometers traveled by motor vehicle 1 up to now, the switch-on operations or activations of electric machine 8 and the total traveling time of motor vehicle 1. Initially, these operating parameters may be preset upon the first activation of control unit 100. The switch-on frequency corresponds preferably to the number of switch-on operations of electric machine 8 within a predefinable distance, which were carried out, for example, in the last 1000 km traveled by motor vehicle 1. Alternatively, the switch-on frequency may also correspond to a number of switch-on operations within an active operation of internal combustion engine 10.

Preferably, the number of switch-on operations is ascertained and stored by control unit 100 during the driving process.

Alternatively, the switch-on frequency may also be ascertained from the number of switch-on operations within a predefinable time, e.g., the last 1000 hours.

In a step 510, the switch-on frequency for electric machine 8 is compared to a predefinable first threshold value. In this context, the predefinable first threshold value corresponds preferably to a quotient of a maximum number of switch-on cycles defined for electric machine 8, divided by a maximum mileage, e.g., in kilometers, assumed for the service life of motor vehicle 1. Preferably, 1.5 million switch-on cycles are provided for an electric machine and a travel distance of approximately 300,000 km for an automobile over its service life.

Alternatively, the predefinable first threshold value may also be ascertained as a quotient of the maximum number of switch-on cycles divided by a length of time assumed for the service life of motor vehicle 1. For example, the assumed service life for an automobile is approximately 13 years.

If the ascertained switch-on frequency exceeds the first predefinable threshold value, the method is continued in a step 520.

If the ascertained switch-on frequency remains below the first predefinable threshold value, the method may be ended or started over in step 500.

In a step 520, a second and a third threshold value are adapted. In this context, the predefinable second threshold value corresponds to a threshold value at which a recuperative operation of electric machine 8 is carried out. Preferably, a recuperative switch-on of electric machine 8 is implemented as a result of a comparison between a first control variance and the second threshold value. The first control variance is determined preferably on the basis of a desired torque and an actual torque of internal combustion engine 10. Alternatively, a desired output and/or an actual output of electric machine 8 and/or of internal combustion engine 10 may also be used.

If the first control variance exceeds the second predefinable threshold value, then a recuperative switch-on of electric machine 8 is called for.

The predefinable third threshold value corresponds in this case to a threshold value at which a boost operation of electric machine 8 is carried out. Preferably, a boost switch-on of electric machine 8 is implemented as a result of a comparison between a second control variance and the third threshold value. The second control variance is determined preferably on the basis of a desired charge-air pressure and an actual charge-air pressure of internal internal combustion engine 10. As an alternative, a desired rate of airflow and an actual rate of airflow may also be used for determining the second control variance. Alternatively, a desired output and an actual output of electric machine 8 and/or of internal combustion engine 10 may be used, as well.

The second and third threshold values are adapted in such a way that the threshold values are increased by a fixed value, for example, if it is determined that the switch-on frequency exceeds the first predefinable threshold value. The result is that the switch-on operations for electric machine 8 are carried out less frequently, since the control variances must amount to a greater value. Thus, the switch-on threshold for the recuperative and the boost operation of electric machine 8 may be adapted successively to the service life of electric machine 8, as well as to the service life of motor vehicle 1.

Alternatively, a weighting may be carried out between the increase of the second and the third threshold value. By way of example, the increase may be split variably between the second and the third threshold value based on the weighting. This has the special advantage, for example, that switching on the recuperative operation of electric machine 8 remains unchanged by how often it has been switched on up to now, but switching on the boost operation of electric machine 8 is reduced, so that protecting the components of electric machine 8 in view of the service life continues to be ensured, but it is nevertheless possible to comply with legislation on exhaust emissions, for example.

In this context, the weighting between the increase of the second and the third threshold value may be variably preset.

Finally, the method may be ended or started over in step 500.

What is claimed is:

1. A method for protecting an electric machine of a motor vehicle, the method comprising the following steps:
    ascertaining a switch-on frequency for the electric machine as a function of operating parameters of the motor vehicle stored in a control unit;
    comparing the ascertained switch-on frequency to a predefinable first threshold value, at least one further threshold value being preset;
    switching on the electric machine when a control variance exceeds the at least one further threshold value; and
    adapting the at least one further threshold value in such a way that the switch-on frequency of the electric machine is limited, when the switch-on frequency exceeds the first predefinable threshold value,
    wherein the at least one further predefinable threshold value is a threshold value for a boost operation of the electric machine or a recuperative operation of the electric machine.

2. The method as recited in claim 1 wherein one predefinable threshold value each is provided for a boost operation of the electric machine and for a recuperative operation of the electric machine.

3. The method as recited in claim 1, wherein a split for a limitation between a boost operation of the electric machine and a recuperative operation of the electric machine is preset as a function of a weighting factor.

4. The method as recited in claim 1, wherein the first predefinable threshold value is determined as a function of operating parameters of the electric machine which make it possible to draw a conclusion about a service life of the electric machine.

5. The method as recited in claim 1, wherein the operating parameters correspond to: (i) a measured number of switch-on operations of the electric machine, and/or (ii) an operating time of the electric machine, and/or (iii) an active operation of the electric machine per kilometer traveled by the motor vehicle.

6. The method as recited in claim 1, wherein the switch-on frequency is ascertained as a function of switch-on operations and/or a distance traveled by the motor vehicle.

7. The method as recited in claim 1, wherein the control variance includes a control variance for a recuperative operation of the electric machine determined as a function of: (i) a desired torque and an actual torque, and/or (ii) a desired output and an actual output of the motor vehicle.

8. The method as recited in claim 1, wherein the control variance includes a control variance for a boost operation of the electric machine determined as a function of: (i) a desired torque and an actual torque, and/or (ii) a desired rate of airflow and an actual rate of airflow, and/or (iii) a desired charge-air pressure and an actual charge-air pressure, and/or (iv) a desired output and an actual output of the motor vehicle.

9. An non-transitory electronic storage medium on which is stored a computer program for protecting an electric machine of a motor vehicle, the computer program, when executed by a computer, causing the computer to perform the following steps:

ascertaining a switch-on frequency for the electric machine as a function of operating parameters of the motor vehicle stored in a control unit;

comparing the ascertained switch-on frequency to a predefinable first threshold value, at least one further threshold value being preset;

switching on the electric machine when a control variance exceeds the at least one further threshold value; and adapting the at least one further threshold value in such a way that the switch-on frequency of the electric machine is limited, when the switch-on frequency exceeds the first predefinable threshold value, wherein the at least one further predefinable threshold value is a threshold value for a boost operation of the electric machine or a recuperative operation of the electric machine.

10. A control unit configured for protecting an electric machine of a motor vehicle, the control unit configured to:

ascertain a switch-on frequency for the electric machine as a function of operating parameters of the motor vehicle stored in a control unit;

compare the ascertained switch-on frequency to a predefinable first threshold value, at least one further threshold value being preset;

switch on the electric machine when a control variance exceeds the at least one further threshold value; and adapt the at least one further threshold value in such a way that the switch-on frequency of the electric machine is limited, when the switch-on frequency exceeds the first predefinable threshold value, wherein the at least one further predefinable threshold value is a threshold value for a boost operation of the electric machine or a recuperative operation of the electric machine.

* * * * *